(12) United States Patent
Joshi et al.

(10) Patent No.: US 9,189,531 B2
(45) Date of Patent: Nov. 17, 2015

(54) ONTOLOGY HARMONIZATION AND MEDIATION SYSTEMS AND METHODS

(71) Applicant: Orbis Technologies, Inc., Annapolis, MD (US)

(72) Inventors: Sameer Joshi, Annapolis, MD (US); Zachery Whitley, Columbia, MD (US)

(73) Assignee: ORBIS TECHNOLOGIES, INC., Annapolis, MD (US)

( * ) Notice: Subject to any disclaimer, the term of this patent is extended or adjusted under 35 U.S.C. 154(b) by 221 days.

(21) Appl. No.: 13/691,655

(22) Filed: Nov. 30, 2012

(65) Prior Publication Data

US 2014/0156638 A1    Jun. 5, 2014

(51) Int. Cl.
*G06F 17/30* (2006.01)
*G06F 17/27* (2006.01)

(52) U.S. Cl.
CPC ...... *G06F 17/30566* (2013.01); *G06F 17/2785* (2013.01); *G06F 17/30545* (2013.01)

(58) Field of Classification Search
CPC ............ G06F 17/30545; G06F 17/30566; G06F 17/2785
USPC ........................................................ 707/722
See application file for complete search history.

(56) References Cited

U.S. PATENT DOCUMENTS

| | | | |
|---|---|---|---|
| 6,119,124 A | 9/2000 | Broder et al. | |
| 6,189,002 B1 | 2/2001 | Roitblat et al. | |
| 6,230,155 B1 | 5/2001 | Broder et al. | |
| 6,240,409 B1 | 5/2001 | Aiken | |
| 6,349,296 B1 | 2/2002 | Broder et al. | |
| 6,529,934 B1 | 3/2003 | Kawamura et al. | |
| 6,654,739 B1 | 11/2003 | Apte et al. | |
| 6,658,423 B1 | 12/2003 | Pugh et al. | |
| 6,678,694 B1 | 1/2004 | Zimmermann et al. | |
| 6,727,927 B1 | 4/2004 | Dempski et al. | |
| 6,751,628 B2 | 6/2004 | Coady | |
| 6,820,075 B2 | 11/2004 | Shanahan et al. | |
| 6,898,594 B2 | 5/2005 | Ushijima et al. | |
| 7,035,876 B2 | 4/2006 | Kawai et al. | |
| 7,139,756 B2 | 11/2006 | Cooper et al. | |

(Continued)

OTHER PUBLICATIONS

Linked Data Meets Ontology Matching—Enhancing data linking through ontology alignments by Scharffe et al., 2011, 6 pages.*

(Continued)

*Primary Examiner* — Rehana Perveen
*Assistant Examiner* — Tiffany Thuy Bui
(74) *Attorney, Agent, or Firm* — Rothwell, Figg, Ernst & Manbeck, p.c.

(57) ABSTRACT

A method and system for harmonizing and mediating ontologies to search across large data sources is disclosed. The method comprises receiving a query targeting a first ontology. The method further comprises translating the query into one or more translated queries, each translated query targeting a respective ontology different from the first ontology. For each of the queries, issuing the query to a respective database organized according to the respective ontology of the query, and receiving a respective result set for the query, wherein the respective result set corresponds to the respective ontology of the query. The method further comprises translating the respective result set into a translated result set corresponding to the first ontology, aggregating the result sets into an aggregated result set corresponding to the first ontology, and returning the aggregated results set corresponding to the first ontology.

37 Claims, 14 Drawing Sheets

(56) References Cited

U.S. PATENT DOCUMENTS

| | | | |
|---|---|---|---|
| 7,158,980 B2 | 1/2007 | Shen | |
| 7,346,491 B2 | 3/2008 | Kanagasabai et al. | |
| 7,392,175 B2 | 6/2008 | Kawatani | |
| 7,392,262 B1 | 6/2008 | Alspector et al. | |
| 7,533,107 B2 | 5/2009 | Gupta et al. | |
| 7,574,348 B2 | 8/2009 | Hon et al. | |
| 7,921,099 B2 | 4/2011 | Bierner | |
| 7,941,851 B2 | 5/2011 | Shahar et al. | |
| 7,954,151 B1 | 5/2011 | Nisbet et al. | |
| 8,027,945 B1 | 9/2011 | Elad et al. | |
| 8,180,787 B2 | 5/2012 | Dettinger et al. | |
| 8,275,546 B2 | 9/2012 | Xiao et al. | |
| 8,281,246 B2 | 10/2012 | Xiao et al. | |
| 8,380,719 B2 | 2/2013 | Chang et al. | |
| 8,521,762 B2 | 8/2013 | Humphreys et al. | |
| 8,572,076 B2 | 10/2013 | Xiao et al. | |
| 2001/0037328 A1 | 11/2001 | Pustejovsky et al. | |
| 2002/0023091 A1* | 2/2002 | Silberberg et al. | 707/103 Y |
| 2002/0087408 A1 | 7/2002 | Burnett | |
| 2003/0028564 A1 | 2/2003 | Sanfilippo | |
| 2004/0044952 A1 | 3/2004 | Jiang et al. | |
| 2004/0243403 A1 | 12/2004 | Matsunaga et al. | |
| 2005/0060305 A1 | 3/2005 | Hopkins et al. | |
| 2005/0091537 A1 | 4/2005 | Nisbet et al. | |
| 2005/0108001 A1 | 5/2005 | Aarskog | |
| 2005/0125429 A1 | 6/2005 | Corston-Oliver et al. | |
| 2005/0165600 A1 | 7/2005 | Kasravi et al. | |
| 2006/0036593 A1 | 2/2006 | Dean et al. | |
| 2006/0167930 A1 | 7/2006 | Witwer et al. | |
| 2006/0173868 A1* | 8/2006 | Angele et al. | 707/100 |
| 2006/0271526 A1 | 11/2006 | Charnock et al. | |
| 2007/0106499 A1 | 5/2007 | Dahlgren et al. | |
| 2007/0128899 A1 | 6/2007 | Mayer | |
| 2007/0208719 A1 | 9/2007 | Tran | |
| 2007/0294610 A1 | 12/2007 | Ching | |
| 2008/0071519 A1 | 3/2008 | Brun et al. | |
| 2008/0114750 A1 | 5/2008 | Saxena et al. | |
| 2008/0133488 A1 | 6/2008 | Bandaru et al. | |
| 2008/0177994 A1 | 7/2008 | Mayer | |
| 2008/0249764 A1 | 10/2008 | Huang et al. | |
| 2008/0294624 A1 | 11/2008 | Kanigsberg et al. | |
| 2009/0012984 A1 | 1/2009 | Ravid et al. | |
| 2009/0024615 A1* | 1/2009 | Pedro et al. | 707/5 |
| 2009/0070103 A1 | 3/2009 | Beggelman et al. | |
| 2009/0070326 A1 | 3/2009 | Kraft | |
| 2009/0077051 A1* | 3/2009 | Edelstein et al. | 707/4 |
| 2009/0089277 A1 | 4/2009 | Cheslow | |
| 2009/0132530 A1 | 5/2009 | Chen et al. | |
| 2009/0259459 A1* | 10/2009 | Ceusters et al. | 704/9 |
| 2010/0010968 A1 | 1/2010 | Redlich et al. | |
| 2010/0042576 A1 | 2/2010 | Roettger et al. | |
| 2010/0050118 A1 | 2/2010 | Chowdhury et al. | |
| 2010/0050131 A1 | 2/2010 | Weise et al. | |
| 2010/0057664 A1 | 3/2010 | Sweeney et al. | |
| 2010/0063966 A1 | 3/2010 | Lemoine et al. | |
| 2010/0070500 A1* | 3/2010 | Cui et al. | 707/736 |
| 2010/0076972 A1 | 3/2010 | Baron et al. | |
| 2010/0082331 A1 | 4/2010 | Brun et al. | |
| 2010/0082634 A1 | 4/2010 | Leban | |
| 2010/0082691 A1* | 4/2010 | Jaster et al. | 707/792 |
| 2010/0191748 A1 | 7/2010 | Martin et al. | |
| 2010/0198864 A1 | 8/2010 | Ravid et al. | |
| 2010/0218134 A1* | 8/2010 | B'Far et al. | 715/780 |
| 2010/0235353 A1 | 9/2010 | Warnock et al. | |
| 2010/0250578 A1 | 9/2010 | Athsani et al. | |
| 2010/0262599 A1 | 10/2010 | Nitz | |
| 2010/0287148 A1 | 11/2010 | Resnick et al. | |
| 2010/0287158 A1* | 11/2010 | Toledano et al. | 707/718 |
| 2011/0087686 A1 | 4/2011 | Brewer et al. | |
| 2011/0225159 A1 | 9/2011 | Murray | |
| 2011/0258193 A1 | 10/2011 | Brdiczka et al. | |
| 2011/0270606 A1 | 11/2011 | Crochet et al. | |
| 2011/0270888 A1 | 11/2011 | Crochet et al. | |
| 2011/0271232 A1 | 11/2011 | Crochet et al. | |
| 2011/0320187 A1* | 12/2011 | Motik et al. | 704/9 |
| 2012/0102022 A1* | 4/2012 | Miranker et al. | 707/713 |
| 2012/0117023 A1* | 5/2012 | Trog et al. | 707/609 |
| 2012/0150835 A1 | 6/2012 | Bobick et al. | |
| 2012/0226707 A1 | 9/2012 | Brun et al. | |
| 2012/0284259 A1* | 11/2012 | Jehuda | 707/722 |
| 2013/0006968 A1* | 1/2013 | Gusmini et al. | 707/722 |
| 2013/0144874 A1 | 6/2013 | Koperda et al. | |
| 2013/0246049 A1* | 9/2013 | Mirhaji | 704/9 |
| 2013/0246315 A1 | 9/2013 | Joshi et al. | |

OTHER PUBLICATIONS

González Moriyón, G., "Disaster Data Interoperability Solution at Stakeholders Emergency Reaction 285069," D4.10 Algorithms and Technology for Data Mediation State of the Art, Seventh Framework Programme, Jul. 30, 2012, 84 pages.

International Search Report dated May 22, 2014, for PCT Application No. PCT/US2013/072292, 1 page.

Choi, N. et al., "A Survey on Ontology Mapping," SIGMOD Record, 35(3):34-41, Sep. 2006.

Shum et al., "ScholOnto: an ontology-based digital library server for research documents and discourse", Int. J. Digit. Libr. 3, 2000, pp. 237-248; Published online: Sep. 22, 2000. Retrieved from < http://download.springer.com/> on <May 28, 2014>.

Uren et al., "Sensemaking tools for understanding research literatures: Design, implementation and user evaluation," Int. J. Human-Computer Studies 64, 2006, pp. 420-445; Available online Nov. 16, 2005. Retrieved from <www.sciencedirecty.com> on <May 28, 2014>.

Finkel et al., "Incorporating Non-local information into information Extraction Systems by Gibbs Sampling", computer science department, Stanford University, (ACL 2005), pp. 363-370.

Ingersoll et al., "Taming Text", How to find, Organize, and Manipultate it, Manning Publications, Jan. 2012, 24 pages.

Apache Software Foundation, "Apache OpenNLP Developer Documentation", 2010, pp. 1-27.

Rivest, "The MD5 Message-Digest Algorithm", MIT Laboratory for Computer Science and RSA Data Security, Inc., Apr. 1992, pp. 1-21.

Dean et al., "MapReduce: Simplified Data Processing on Large Clusters", USENIX Association, OSDI '04: 6th Symposium on Operating Systems Design and Implementation, 2008, pp. 137-149.

White at al., "Hadoop: The Definitive Guide MapReduce for the Cloud—MapReduce for the Cloud", May 2009, 1 page.

Manning et al., "An Introduction to Information Retrieval", Cambridge University Press, (c) 2009, pp. 1-544.

Apache Software Foundation, "Cassandra", The Apache Cassandra Project, 2009, pp. 1-3.

Fukumoto et al. "Oki Electric Industry: Description of the Oki System as Used for MUC-7", Kansai Lab, R&D group, 1998, pp, 1-7.

Garigliano et al., "University of Durham: Description of the Lolita System as used in MUC-7", Laboratory for Natural Language Engineering, Department of Computer Science, 1995, pp. 1-15.

Lin, "Using Collocation Statistics in Information Extraction" Department of Computer Science, University of Manitoba, 1998, pp. 1-10.

Humphreys et al., "University of Sheffield: Description of the LaSIE-II System as Used for MUC-7", Department of Computer Science, University of Sheffield, 1998, pp. 1-20.

Huyck, "Description of the American University in Cairo's System Used for MUC-7", the American University in Cairo, 1998, pp. 1-13.

Miller at al., "Algorithms that Learn to Extract Information BBN: Description of the Sift System as used for MUC-7", BBN Technologies, 1998, pp. 1-17.

Brady at al, "Description of Lockheed Martin's NLToolset as Applied to MUC-7 (AATM7)", 1998, pp. 1-12.

Yangarber et al., "NYU: Description of the Proteus/PET System as Used for MUC-7 ST", Computer Science Department, New York University, 1998, pp. 1-7.

Aone et el., "SRA: Description of the IE2 System Used for MUC-7", 1998, pp. 1-14.

Patten et al., "Description of the Tasc System Used for MUC-7", TASC, 1998, pp. 1-5.

(56) References Cited

OTHER PUBLICATIONS

Black et al., "Facile: Description of the NE System used for MUC-7", Department Language Engineering, 1998, pp. 1-10.
Krupka et al., "IsoQuest, Inc.: Description of the NetOwlTM Extractor System as Used for MUC-7", 1998, pp. 1-10.
Yu et al, "Description of the Kent Ridge Digitai Labs System Used for MUC-7", 1998, pp. 1-9.
Chen et al. "Decription of the NTU System Used for Met2", Natural Language Processing Laboratory, Department of Computer Science and Information Engineering Natiora Taiwan University, 1998, pp, 1-9.
Borthwick et al, "NYU: Description of the MENE Named Entity System as Used MUC-7", Computer Science Department, New York University, 1998, pp. 1-12.
Fukumoto et al., "Oki Electric Industry: Description of the Oki System as Used or MET-2", Kansai Lab., R&D group, 1998, pp. 1-6.
Mikheev et al., "Description of the LTG System Used for MUC-7", HCRC Language Technology Group, 1998, pp. 1-12.
Baldwin et al., "Description of the Upenn Camp System as Used for Coreference", Institute for Research in Cognitive Science, 1998, pp. 1-10.

* cited by examiner

ONTOLOGY HARMONIZATION AND MEDIATION SYSTEMS AND METHODS

TECHNICAL FIELD

The present invention relates to systems and methods for harmonizing and mediating ontologies to search across large cloud and non-cloud data sources.

BACKGROUND

Data relevant to a given query may be stored across many different types of databases, for example, triple store, relational (SQL store), or cloud databases (e.g. Hadoop, Cloudbase, HBase). However, searching across multiple types of large scale, heterogeneous databases, poses a variety of technical and scientific challenges.

For example, in traditional extract transform load ("ETL") approaches, the data in each database is duplicated and converted to a common model, which poses a significant challenge at the petabyte-scale. Additionally, synchronization issues may arise at larger scale and BASE semantics.

The differences in data formats, granularities, schemas, and distributions are the biggest challenge to data integration. Data sources are almost always different in their structural models and representation, but may also be different in their coverage, granularity, perspective, and terminology. To complicate matters further, different communities may use the same schema in different ways (semiotic heterogeneity). Additionally, in traditional ETL approaches, if data sources do not align property, any impedance mismatch between two data models is baked into the transformed data.

These challenges are only magnified at scale. Traditional ETL approaches to data integration and fusion fail for cloud scale data. The sheer scale of the data makes it impractical to convert and redundantly store it for the purpose of querying.

Due to the deficiency of the prior art, there exists a need for a software middleware component that mediates between multiple data models and allows queries to be performed against large scale, heterogeneous databases.

SUMMARY

According to various embodiments, a multi-database query system and method is designed to overcome the shortcomings of traditional ETL approaches by employing a novel ontology harmonization and mediation approach.

In accordance with a first aspect of the present invention, a method of servicing a multi-database query is disclosed. The method comprises receiving a query targeting a first ontology. The method further comprises translating the query into one or more translated queries, each translated query targeting a respective ontology different from the first ontology. For each of the queries, issuing the query to a respective database organized according to the respective ontology of the query, and receiving a respective result set for the query, wherein the respective result set corresponds to the respective ontology of the query. The method further comprises translating the respective result set into a translated result set corresponding to the first ontology, aggregating the result sets into an aggregated result set corresponding to the first ontology, and returning the aggregated results set corresponding to the first ontology.

In accordance with a second aspect of the present invention, a system to implement an ontology harmonization and mediation ("OHM") engine is disclosed. The system comprises two or more databases, one or more computer processing cores, and one or more memories coupled to the computer processing cores and storing program instructions executable by the processing cores to implement an ontology harmonization and mediation engine. The OHM engine may be configured to issue a query across two or more databases by: receiving a query targeting a first ontology and translating the query into one or more translated queries with each translated query targeting a respective ontology different from the first ontology. For each of the queries, the OHM engine may be further configured to issue a multi-database query by: issuing each of the queries to a respective database organized according to the respective ontology of the queries, and receiving respective result sets for each of the queries, wherein the respective result sets correspond to the respective ontologies of the queries. Furthermore, the OHM engine may be further configured to issue a multi-database query for each of the translated queries by translating the respective result set into a translated result set corresponding to the first ontology, aggregating the result sets into an aggregated result set corresponding to the first ontology, and returning the aggregated results set corresponding to the first ontology.

In accordance with another aspect of the Invention, the system may also provide a graphical user interface ("GUI") accessible through an analytics layer. The OHM GUI may be displayed on a display device, such as a screen, that is connected to a computer. A user may interact with the GUI using an input device, such as a mouse and/or keyboard, connected to the computer.

Moreover, another aspect of the Invention includes an OHM GUI that displays a dataspace navigator that displays a unified virtual view of the data sources. The data sources may be represented as one or more tree graphs with a hierarchy of nodes corresponding to attributes of the one or more data sources and one or more edges corresponding to relationships between the attribute nodes. The dataspace navigator may optionally display data volume statistics about the underlying data sources.

According to yet another aspect of the invention, the OHM GUI displays an OHM ontology explorer that depicts the relationships within one or more ontologies. Each ontology may be represented as one or more tree graphs with a hierarchy of nodes corresponding to attributes of the ontology and edges corresponding to relationships between the attribute nodes.

An additional aspect of the invention includes a visual query tool displayed in the OHM GUI. A user may optionally build a query using the visual query tool by selecting one or more nodes from, for example, the OHM ontology explorer or OHM dataspace navigator, and selecting relationships between the one or more selected nodes.

According to yet another aspect of the invention, the OHM GUI may include a virtual unified view of query results, for example, corresponding to the target ontology of the issued query.

The above and other aspects and embodiments of the present invention are described below with reference to the accompanying drawings.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 12 is an illustrative workspace window generated by the OHM system, according to the present invention, including a virtual unified view of query results.

FIG. 13 is an illustrative workspace window generated by the OHM system, according to the present invention, including a mapping advisory feature.

DETAILED DESCRIPTION

Figure 1:
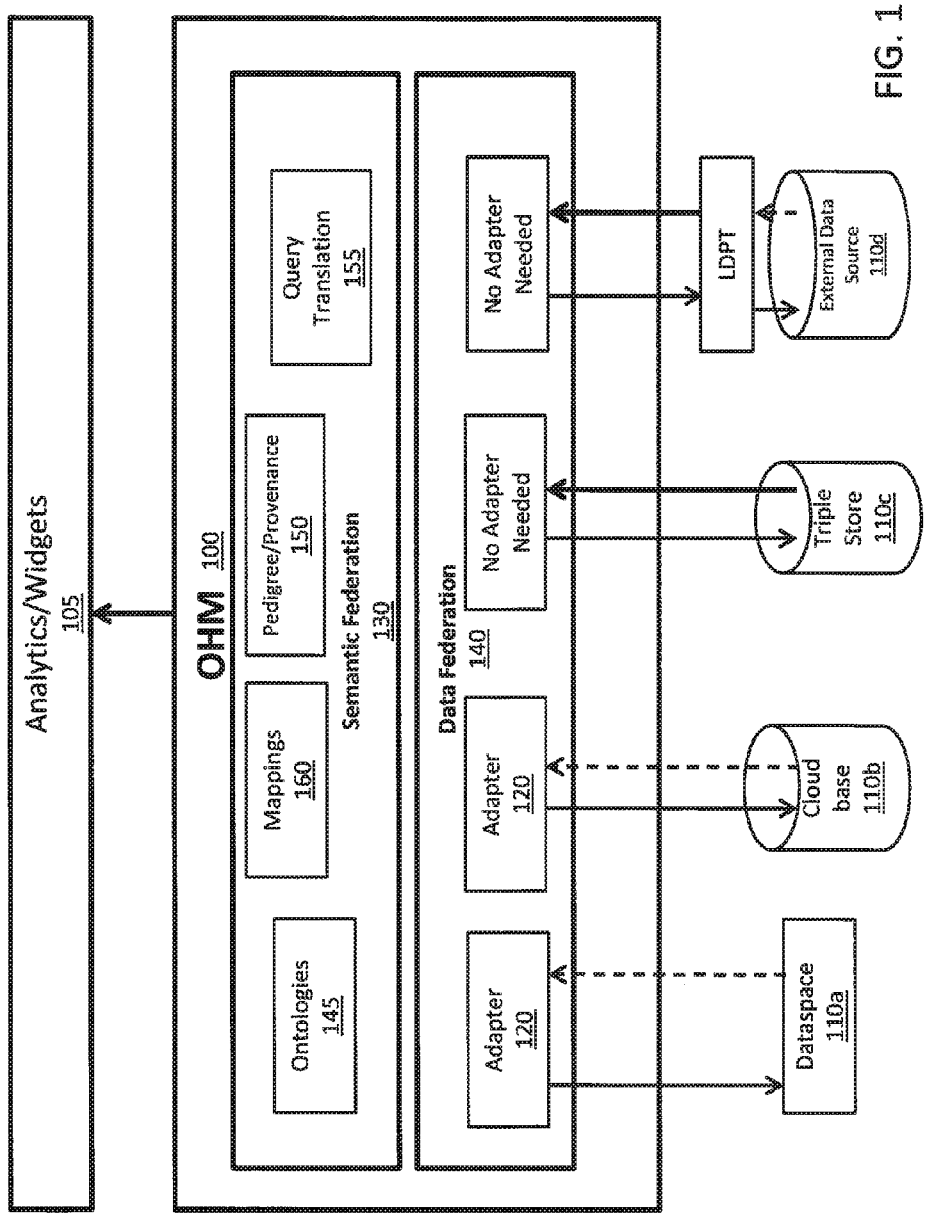
FIG. 1 is a schematic diagram illustrating the OHM architecture, according to some embodiments of the present invention.

An ontology provides a structural framework for organizing information and serves as a knowledge representation of a domain. Using certain categories, an ontology represents entities, Ideas, and events, in addition to their properties and relationships. Ontologies may provide a common framework that allows data to be shared and reused across boundaries.

The inventive ontology harmonization and mediation ("OHM") system and methods significantly reduce the amount of time required for data integration by, for example, providing a software middleware component that mediates between data models associated with ontologies. The mediation software allows for queries to be performed simultaneously against heterogeneous databases, such as triple store, relational database (SQL store), and cloud store (e.g., Hadoop, Cloudbase, HBase). The OHM systems and methods incorporate an ontological representation of the data and provide data mediation across disparate data sources without the need to transform them to a common format first.

Since data is left in its native format, the complexity of the problem domain is transferred to the issue of logical query translations. A virtual unified view of the data is provided by translating the end user's query to each of the native formats of the databases on the fly, then collecting and presenting the results. This approach is difficult to realize outside of formal web semantics.

In some embodiments, a corpus of data artifacts (e.g., natural language documents) may be ingested into the system and converted to a suitable semantic representation, such as a Resource Description Framework document RDF. However, it should be understood that in various embodiments, the input may be any data artifacts and the semantic representation may be described in RDF or in any other suitable semantic representation language. Examples of Ingesting data sources into the OHM system can be found in co-pending U.S. patent application Ser. No. 13/422,962, filed Mar. 16, 2012, which is incorporated in its entirety herein by reference.

All previous extract transform load approaches duplicate the data by converting it to a common model. This approach poses a significant challenge at the petabyte-scale. OHM overcomes this deficiency by, for example, working with data in its native form and storage, also referred to as direct ingest data. This makes OHM lightweight and ideal for big data. Additionally, since OHM works with native data, it bypasses the issue of synchronization.

Particularly in the cloud use case, there are challenges when data sources do not align properly (for instance, geo and HUMINT data). In prior ETL approaches, any impedance mismatch between two data models is baked into the transformed data. If some transformation has to be bettered down the line, the entire dataset would need to be re-ingested. Additionally, ETL approaches tend to wash away individual source distributions by forcing them all into the same storage schematics.

With OHM, however, any correction to the model alignment immediately shows up without requiring any other changes. OHM makes it easy to work with multiple data models, and offers easy governance of both models and model alignments through versioning and governance metadata. As a result, both the alignments between data models and the models themselves can be improved incrementally without loss of operations. Furthermore, since OHM retains the native distribution, there is an avenue for better, data-driven analytics development.

The differences in data formats, granularities, schemas, and distributions are the biggest challenge to data integration. The data sources are almost always different in their structural models and representation, but may also be different in their coverage, granularity, perspective, and terminology. To complicate matters further, different communities may use the same schema in different ways (semiotic heterogeneity). Another often overlooked difference is that the data distributions usually vary across different sources. For example, the data generated by an automated Natural Language Processing ("NLP') process is very different from a structured human generated source. Any fusion approach has to handle these kinds of heterogeneity.

In addition, the challenges are magnified at scale. Cloud scale fusion offers new challenges, the study of which may further data science. For example, NLP processes provide very large amounts of data tagging to a shallow ontology.

NLP data needs to be aligned with RDBMS data, which is typically much smaller in volume but tags to a larger ontology.

However, since OHM is data architecture agnostic, it can sit on both cloud scale stores as well as streaming data. OHM inherits the security policies and provisions of the underlying storage. It also offers an easy way to add application level security and access policies via element metadata within mapping files and ontologies.

In an exemplary embodiment, OHM is implemented using open semantic standards such as Web Ontology Language ("OWL") and Resource Description Framework ("RDF"). In particular, ontologies may be mediated using open source standards, such as Expressive and Declarative Ontology Alignment Language ("EDOAL"), which enables OHM query translation and Issuance across different ontologies and data sources.

OHM offers a semantic web enabled layer on the underlying big data storage. Additionally, any store or data schema integrated with OHM is available to the entire enterprise. Any analytics being developed in the system have a stable dependency on the open standards (OWL) provided by OHM, and not on the underlying data sources and data models. Furthermore, the utilization of open standards such as OWL and RDF for data mediation is especially important to lower integration costs of sources and facilitate community acceptance.

Referring now to FIG. 1, according to an exemplary embodiment of the present invention, the OHM architecture 100 is divided into two broad groups: semantic federation 130 and data federation 140. A user poses a single query comprising, for example, a target ontology, to the OHM system 100 from analytic layer 105, and ultimately receives a response from multiple databases or data sources 110 at analytic layer 105. Each data source 110 is directly ingested into the OHM system 100 in its native data format.

In an exemplary embodiment, each data source 110 is associated with at least one ontology. The semantic federation 130 stores the ontologies using the ontology module 145 for the various data sources 110. Additionally, the semantic federation takes the user query and translates it through query translation module 155 for each of the target ontologies associated with data sources 110 using previously defined and stored mappings managed in mapping module 160. Additionally, the semantic federation 130 stores and tracks information about data sources 110 in the pedigree/provenance module 150. Such information, for example, may comprise metadata of the pedigree/provenance nature.

In an exemplary embodiment, OHM translates a query across different data models and ontologies using open source standards. For example, EDOAL allows for representing correspondences or mappings between the entities of two or more ontologies. OHM may utilize EDOAL to define mappings between different data source 110 ontologies. These mappings in turn enable OHM translate, or map, a query from one ontology format to a second, different ontology format corresponding to a data source 110 in order to execute the original query.

In one embodiment, the semantic federation 130 disambiguates entities across multiple databases for certain applications. For example, one may need to verify that "John Smith" in a first data source 110 is the same "J. Smith" in a second data source 110. In one embodiment, for such entity correlation and disambiguation, a database is maintained in mapping module 160. The database may provide, for example, "same-as" assertions across entities in the enterprise. In some embodiments, these "same-as" assertions may comprise defined mappings in EDOAL to be used for ontology mediation and query translation.

In another embodiment, the semantic federation 130 maintains and stores source specific statistics and metadata describing the data source content both qualitatively and quantitatively. This data is managed by the pedigree/provenance module 150. Such data facilitates heavy optimization on private enterprises with well described sources. Using these source statistics overcomes many challenges that have traditionally made federations relying on the "open world assumption" intractable commercially.

The data federation 140 manages and describes the various data sources 110 available to OHM. In one embodiment, the data federation 140 translates a user query comprising, for example, a target ontology into translated queries for each source ontology associated with data sources 110 using adapter module 120. The data federation 140 then issues the translated queries to each data source 110 associated with the target and source ontologies and propagates the results.

In another embodiment, the data federation 140 uses adapter module 120 to translate non-standard data formats (such as custom NoSQL tables) from the data sources 110 to a standard resource description framework ("RDF") format. In an exemplary embodiment, each data source 110 contains a SPARQL, or RDF query language, endpoint. For example, when data source 110a or 110b is added to OHM 100, the data federation 140 may use an adapter module 120 to translate the data from data sources 110a and 110b into RDF format. For some data sources, such as triple store data source 110c, no adapter is needed because triples can already be imported and exported from the triplestore using RDF.

In some embodiments, a custom software component for adapter 120 may be required for a data source 110 that does not support complex SPARQL queries. For example, data source 110a may represent a customized database that does not support open standards like SPARQL and RDF. In a preferred embodiment, an adapter 120 software module will be employed to provide a direct RDF format mapping to data source 110a. As another example, a data source 110b may be a cloud based database that does not support RDF or SPARQL, and therefore requires an adapter module 120. Moreover, as another example, a data source 110d may be any external data source, such as a structured source, an abstract database, a spreadsheet, a relational database, etc. that does not support open standards and may require an adapter module 120.

Adapter module 120 may include open source software that converts certain databases, such as relational or SQL databases, to a SPARQL endpoint. In other embodiments, a custom software component in adapter module 120 may be used to create a SPARQL or RDF endpoint. For example, LDPT software may be customized to provide a direct RDF format mapping to the relational schema of a relational data source 110.

In an exemplary embodiment, for data sources that do not support SPARQL queries and require adapter module 120, OHM will break a SPARQL query into its component parts, or basic graph patterns. The basic graph patterns are the atomic components of a SPARQL query that every data source 110d may support. These component queries may then each be issued and mapped by OHM to the data sources 110 that do not support complex SPARQL queries. The result data from each of the component queries for each of data sources 110 is returned. In a preferred embodiment, the overlap result set that responds to the original SPARQL query is determined, for example, through a series of joins.

Each data source 110 that is to be ingested by the OHM system 100 is described by an ontology, referred to as a source ontology. Ontologies are mediated by the ontology module 145 and mapping module 160 in the semantic federation 130 through the creation and storage of mappings between the ontologies using a formal semantic language. To query the OHM system 100, the end user selects an ontology, called a target ontology, and a set of source ontologies are mapped to the target ontology. As described above, these mappings may be defined in EDOAL and stored in an OHM database.

In an exemplary embodiment, the end user issues a query on the target ontology in the analytic layer 105. OHM provides an application program interface in the analytic layer 105 that allows a user to select a particular target ontology, and then issue a query associated with the target ontology to OHM system 100 and receive results based on that ontology. The heterogeneity of the system is masked from the analytic layer 105. In some embodiments, the OHM system provides a GUI to allow users to browse mappings and ontologies and to create mappings between two ontologies. This GUI is described in further detail below and in FIGS. 9-13.

In an exemplary embodiment, a query is translated from the target ontology to each one of the source ontologies mapped to the target ontology using, for example, the query translation module 155 and the mapping module 160 and the stored EDOAL mappings. The translated queries associated with a source ontology are issued to the respective source ontologies associated with data sources 110. Each data source 110 returns a result set, and the result sets are aggregated and translated to the format required by the initial target ontology in the data federation 140. The result data translation to the target ontology is conducted on the fly and is specified by the corresponding mapping module 160. The complexity of the query being asked is limited by the capability of the underlying data store or data source 110, as the source query is issued against it.

In one embodiment, it may be desirable to disambiguate entities across multiple databases for certain applications. For example, one may need to verify that "John Smith" in a first data source 110 is the same "J. Smith" in a second data source 110. In some embodiments, for such entity correlation and disambiguation, a database is maintained by the mapping module 160 in the semantic federation 130. The database provides "same-as" assertions across entities in the enterprise.

In another embodiment, the semantic federation 130 maintains source specific statistics and metadata describing the content both qualitatively and quantitatively. This data is stored using the pedigree/provenance module 150. This facilitates heavy optimization on private enterprises with well described sources. Using source statistics overcomes many challenges that have traditionally made federations relying on the "open world assumption" intractable commercially.

Figure 2:
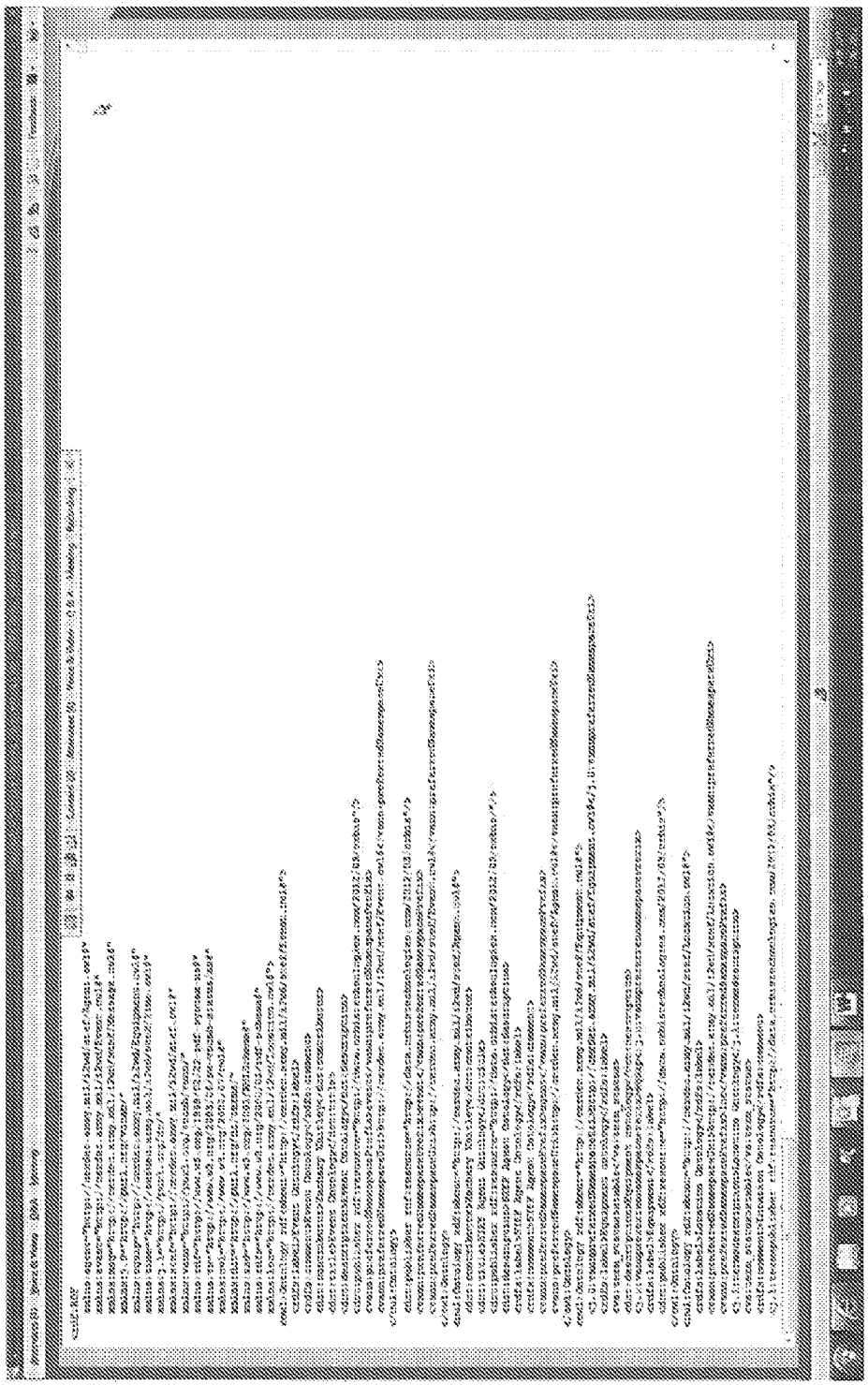
FIG. 2 is an illustrative workspace window generated by the OHM system, according to the present invention, including an ontology.

Referring now to FIG. 2, an illustrative workspace window generated by the OHM system according to the present invention including an ontology in Web Ontology Language ("OWL") is shown. OWL is a family of knowledge representations for creating ontologies that is characterized by formal semantics and RDF/XML-based serializations. Persons of skill in the art can appreciate that ontologies may be implemented in many different formats and languages. The illustrative workspace window in FIG. 2 displays program code of an OWL based ontology that can be used in the OHM system. The program code may contain, for example, a collection of assertions about the ontology grouped under an "owl:Ontology" tag. In the ontology of FIG. 2, several attributes are included within with owl:Ontology tag, such as "rdfs:label" and "rdfs:comment," etc.

Figure 3:
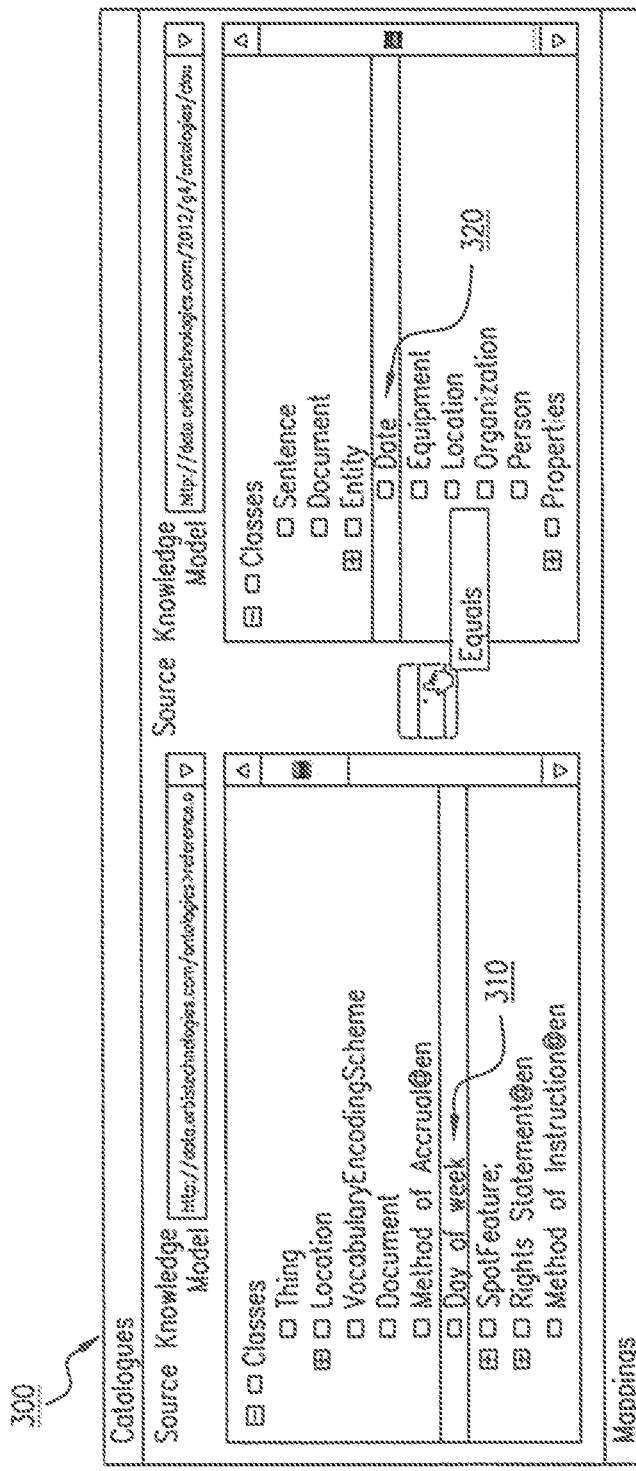
FIG. 3 is an illustrative workspace window generated by the OHM system, according to the present invention, including an instance mapping feature.

Referring now to FIG. 3, an Illustrative workspace window generated by the OHM system according to the present invention including an instance mapping feature is shown. In an exemplary embodiment, the OHM system 100 provides the tools in mapping module 160 to map and convert instances from one ontology format to another ontology format. For example, as illustrated in illustrative workspace window 300 of FIG. 3, if a user mapped "Day of week" 310 in a user/analytic ontology to 'Date' 320 in a data source ontology, the user would get also get "Day of the week" results when the user queries "date". However, when two or more data schemas are mapped, the instance format of the data may be different. The OHM system 100 can translate this difference in format for the user, assuming that the difference was defined in the mapping module 160.

The illustrative workspace window 300 generated by the OHM system in FIG. 3, in some embodiments, may be displayed in analytics layer 105 by an OHM GUI. A user may interact with the GUI in analytics layer 105 using a display device, such as a screen or monitor, connected to a computer 800 with program code to run OHM. In an exemplary embodiment, the GUI will display a mapping tool with a split window that contains information about one or more ontologies on one side of the window with information about one or more different ontologies on the other side. The mapping tool may be further configured to receive input from a user to select a first characteristic or attribute of an ontology from a first side of the window.

In an exemplary embodiment, an OHM user may select a relationship, such as "equals," from a menu item or button displayed by the mapping tool. The relationship selection allows a user to specify a desired mapping between the first selected ontology attribute to an attribute in a second displayed ontology. The attributes of the second ontology may be displayed on the second side of the split window of the mapping tool, and a user may select a second attribute to be mapped to the first attribute. A person of skill in the art can appreciate that the mapping tool may be configured to display different ontologies in the split window and details of attributes, based on user input and interaction with the OHM GUI.

Figure 4:
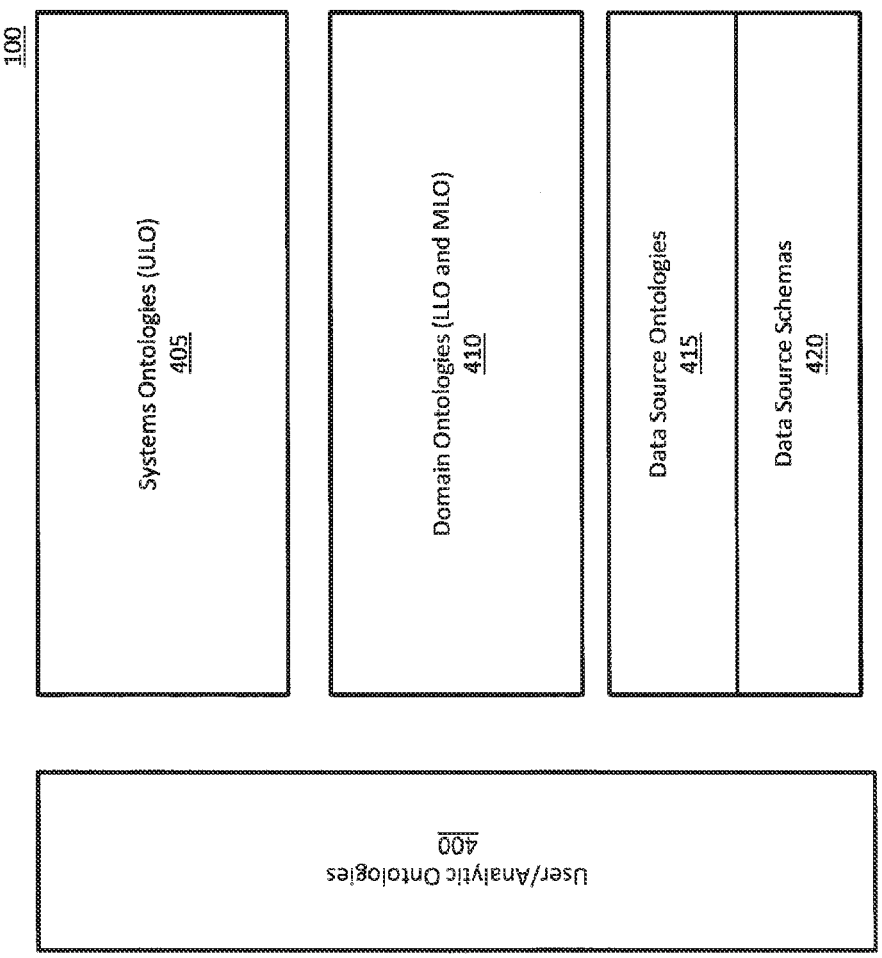
FIG. 4 is a schematic diagram illustrating the ontology mapping architecture, according to some embodiments of the present invention.

Referring now to FIG. 4, a schematic diagram illustrating the ontology mapping architecture, according to some embodiments of the present invention, is shown. The data schemas can be complex and have hierarchical and logical relationships that need to be captured when aligning or mapping with a different data source. For example, a 'leader' of an organization is also a 'member' of an organization. Another example: both 'person of interest' and 'tracked person' in data source A may map to 'suspect' in data source 'B'.

These semantics are often difficult to capture using relational mapping tools; especially in cloud or streaming architectures that do not always rely on relational storage. The schema representation has to provide inference capabilities in order to be useful for mediation.

In an exemplary embodiment, OHM uses ontologies as recommended by W3C standards for mediation. Ontologies come with standards and open source tools, and provide inference and complex representational capabilities.

In some embodiments of the OHM system 100, ontologies are mediated to a central ontology (in a star configuration), or to each other as needed. While a person of skill in the art can appreciate that the OHM system 100 allows plug and play of any ontology and mapping architecture, the layout of ontologies has a deep impact on the engineering quality of the system. The mapping architecture depicted in FIG. 4 represents an exemplary embodiment of the semantic modeling domain.

Each data source 110 is described by a data source schema 420. Data source schemas 420 provide direct mapping to data source systems 110. The data source schemas 420 associate data between database tables with logical rules. Additionally, the data source schemas 420 map information to either DSI ontology or domains.

In one embodiment, each data source schema 420 is overlaid with one data source ontology 415. This ontology represents the same information as the schema, but does it by using best practices for a semantic mediation use case. This prevents impedance mismatch that may arise from, for example, using a relational schema in a semantic system. In some embodiments, the data source ontologies 415 are versioned, allowing the data source owner to evolve the schema while mitigating risk to the existing capabilities that rely on that source.

The data source ontologies 415 comprise well-formed semantic projections on data source schemas 420. They may be thought of as an "ontological semantic DAL." The data source ontologies 415 are mapped to many small domain ontologies 410.

Domain ontologies 410 contain domain-specific classes of entities, attributes, and relations, which captures high-level knowledge about the information at the DS and DSI levels. The domain ontologies 410 define the models associated with specific capabilities, such as signals processing, soft-target tracking, etc. The domain ontologies 410 are created with an engineering focus on providing good mediation and inferencing capabilities, and do not focus on an exhausting descriptive capability.

The systems ontologies 405 provide top level information about the entire theater of operations. These combine many domain ontologies to provide a comprehensive picture relevant to a specific theater. Systems ontologies 405 provide a means to combine multiple domains together to understand mission-critical elements across various areas of Interest. In general, these systems ontologies 405 are fusion ontologies for multiple domains. By leveraging the domain ontologies, the systems ontologies 405 reduce ontology complexity and size.

The user/analytic ontologies 400 are end user facing, and capture the elements important to the user. The user/analytic ontologies 400 provide different perspectives on data that capture user points of view. User/analytic ontologies 400 can be used to drive various analytics, user interfaces ("UIs"), and reporting services across the OHM system 100.

For example some user ontology 400 may capture the vernacular of a community and map it to the underlying system, giving the user a customized view of the underlying data. User ontology 400 can also be used to restrict or filter data, possibly as needed in a coalition environment. As an example, an analytic ontology 400 may map to all the sources that provide information pertinent to its calculation. The user/analytic ontologies 400 may map to any other ontology in the system, such as systems ontologies 405 for a broad capability such as search. A geo-analytic may map to only geo-domain ontologies.

Additionally, in some embodiments, it is possible to create multiple alignments between two data sources. This allows for multiple users to tune the system to their specific mediation use cases. Additionally, the versioning of alignments allows the system to populate the mappings incrementally fleshing them out over time while delivering early capability.

The architecture formed by the Interconnection of ontologies in OHM may provide significant capability. This architecture would require engineering from domain experts and will have to be created and/or tuned for each enterprise use case for OHM. In an exemplary embodiment, the following architectures have been determined to be of value: 1) star, 2) increasing sophistication, 3) domain model, 4) collation.

Star architecture supports enterprise integration patterns (EIP) by allowing for various disparate data sources to be integrated together. In the simplest case, different source ontologies are mediated to a central "integration ontology." The integration ontology provides a unified view, to the extent possible, on the different datasets. In more complex cases, multiple systems ontologies might be involved.

Increasing sophistication architecture supports the use case for data fusion. The source ontologies provide raw data. These ontologies are carefully mediated to increasingly higher order ontologies in a tree configuration. An example of this would be mediated ontology architecture providing Joint Directors of Laboratories ("JDL") type fusion.

Domain model architecture applies to the case where the enterprise provides different data sources about the same physical or logical process, so that the different ontologies provide different aspects of a related process. An example of this use case would be medical device manufacture. In this case the different ontologies in the system align well with and complement each other as they belong to the same physical domain. The topology of the final architecture reflects the structure of the system in a manner similar to object oriented design ("OOD").

Collation architecture allows users of the system to contribute to their own integration ontology. In this case, a new source is mediated to the existing central integration ontology to the extent possible. The subset that could not be mediated is simply appended to the integration ontology, providing full integration and enhancement for subsequent integration. This approach would work well only when embedded in a specific domain or the integration ontology would become too large. A use case for this architecture is medical collaboration.

In a preferred embodiment, the semantic mappings are standards based, for example, using EDOAL, and user friendly. The lookups and data transformation can be performed in memory. The performance cost in terms of latency is very low.

Figure 5:
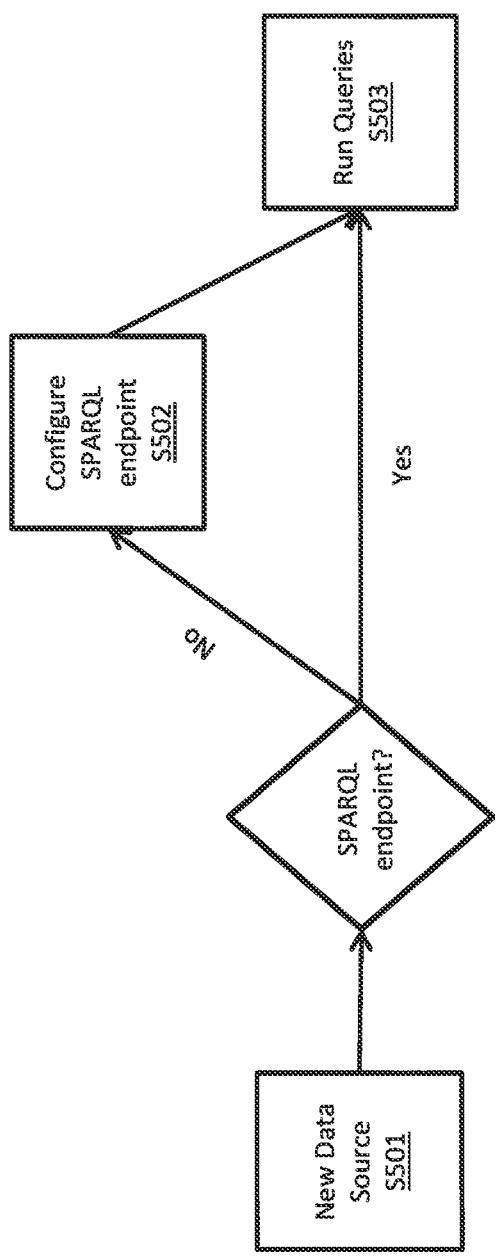
FIG. 5 is a flow diagram illustrating the steps of adding a data source according to some embodiments of the present invention.

Referring now to FIG. 5, a flow diagram illustrating the steps of adding a data source according to some embodiments of the present invention is shown. A data source 110 is added to OHM system 100 in step S501. In an exemplary embodiment of the OHM invention, each data source 110 is configured with a SPARQL endpoint in order to facilitate lightweight query translation on the fly. In step S502, if the data source does not have a SPARQL endpoint, then a SPARQL endpoint is created. As explained above, there is existing software that converts certain data sources to SPARQL endpoint, or a custom component may be deployed to create a SPARQL endpoint. Once the SPARQL endpoints are configured, translated queries may be run in step S503 for the ontologies associated with each data source 110.

Figure 6:
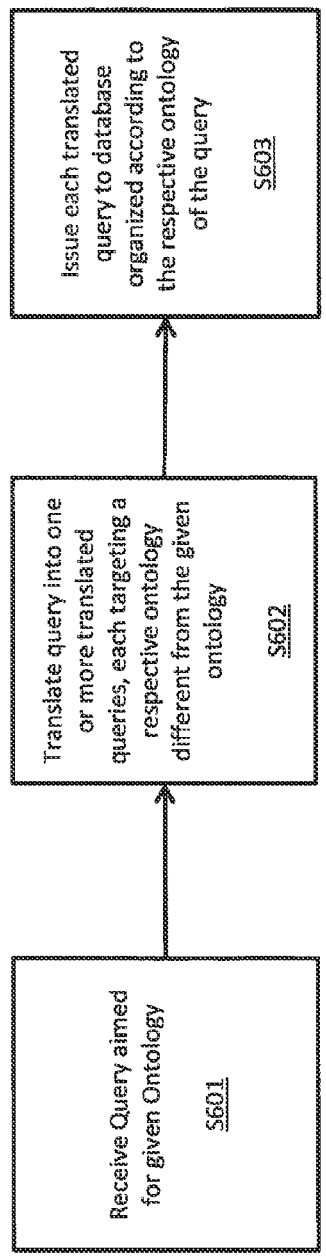
FIG. 6 is a flow diagram illustrating the steps of translating a query according to some embodiments of the present invention.

Referring now to FIG. 6, a flow diagram illustrating the steps of translating a query according to some embodiments of the present invention is shown. At step S601, the OHM system 100 receives a query aimed for a given or target ontology. The target ontology has a set of source ontologies mapped to it, which is managed by mapping module 160. At step S602, the query is translated into queries to target each of the source ontologies associated with the target ontology. The translation is performed using the mapping module 160 and the ontology architecture described above. Once each translated query is translated for the source ontologies, the translated queries are issued to the databases organized according to the respective ontologies (source and target ontologies) of the translated queries in step S603.

In some embodiments, OHM can split a query and distribute its components across the relevant data sources across the federation. Each component may be translated from a target ontology to different source ontologies.

Figure 7:
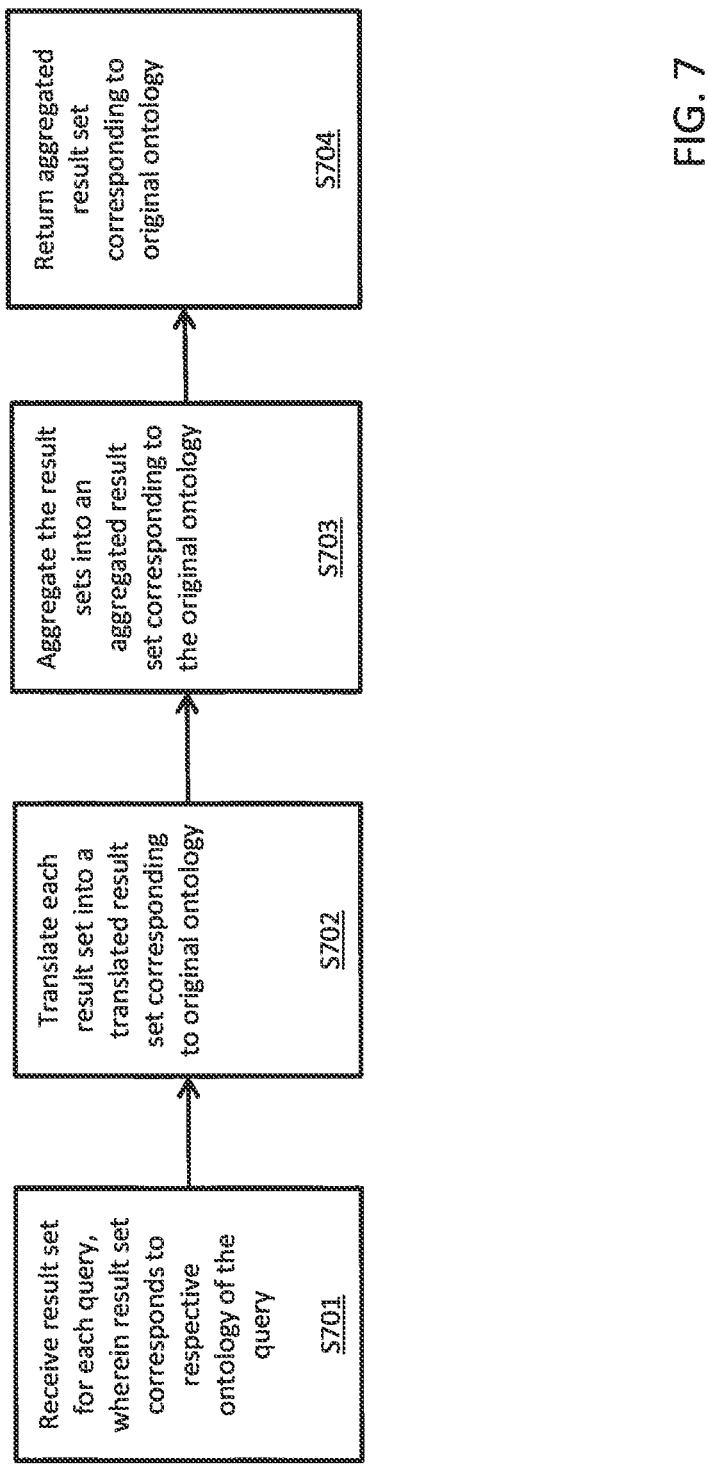
FIG. 7 is a flow diagram illustrating the steps of collecting and aggregating result data according to some embodiments of the present invention.

Referring now to FIG. 7, a flow diagram illustrating the steps of collecting and aggregating result data according to some embodiments of the present invention is shown. At step S701, the OHM system receives result sets for each query wherein each result set corresponds to the respective ontology of the query. In one embodiment, these result sets are translated in step S702 into a result set corresponding back to the target ontology of the original query. In another embodiment, the translated result sets are also aggregated into an aggregated result set corresponding to the target ontology of the original query in step S703. The aggregated result set corresponding to the target ontology is then returned to the user in step S704.

In some embodiments, a query may be split and its components are issued across the relevant data sources across the data federation. Consequently, when result sets are received in step S701, the results are combined to answer the original query. Such combination may also occur, for example, in translation step S702 and/or aggregation step S703.

Figure 8:
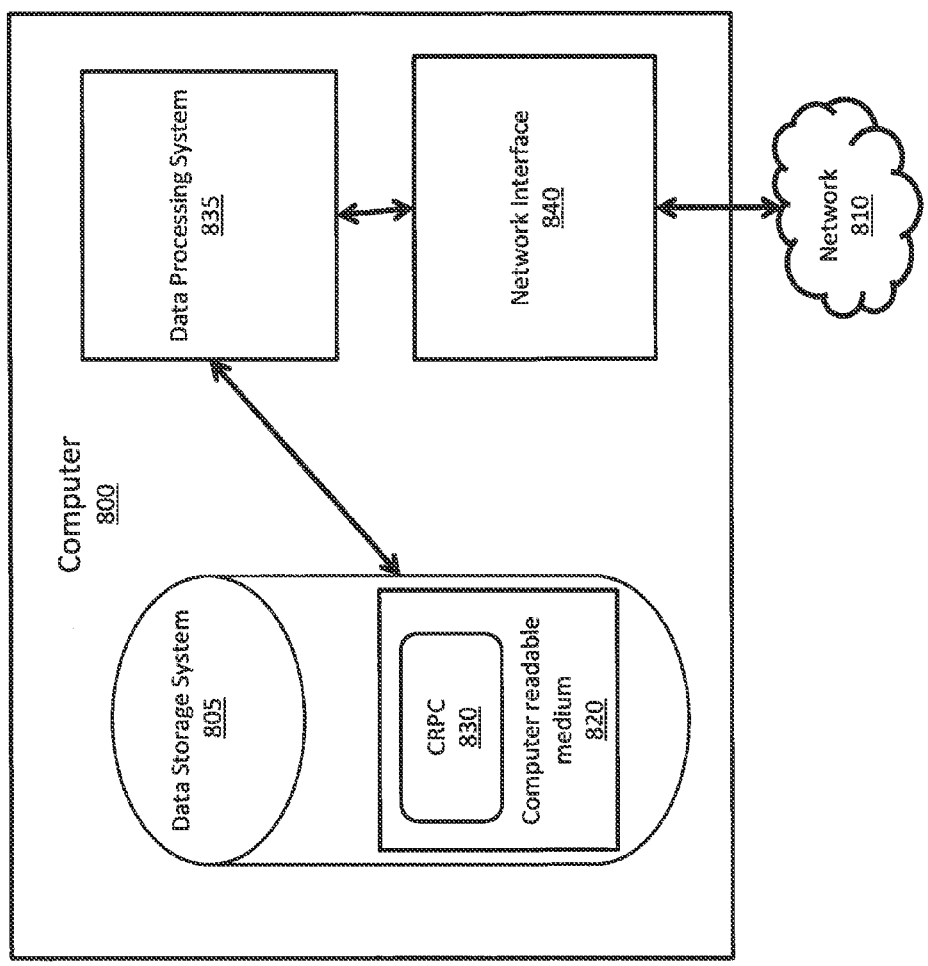
FIG. 8 illustrates a possible implementation for at least some components of a computer, according to some embodiments of the present invention.

Referring now to FIG. 8, a possible implementation for at least some components of a computer, according to some embodiments of the present invention, is shown. As shown in FIG. 8, computer 800 may include a data processing system 835. In some embodiments, data processing system 835 may include any number of computer processors, any number of which may include one or more processing cores. In some embodiments, any of the processing cores may be physical or logical. For example, a single core may be used to implement multiple logical cores using symmetric multi-threading.

Computer 800 also includes network interface 840 for receiving messages (e.g., messages transmitted from a client) and transmitting messages over network 810, and a data storage system 805, which may include one or more computer-readable mediums. The computer-readable mediums may include any number of persistent storage devices (e.g., magnetic disk drives, solid state storage, etc.) and/or transient memory devices (e.g., Random Access Memory).

In embodiments where data processing system 835 includes a microprocessor, an OHM computer program product may be provided. Such a computer program product may include computer readable program code 830, which implements a computer program, stored on a computer readable medium 820. Computer readable medium 820 may include magnetic media (e.g., a hard disk), optical media (e.g., a DVD), memory devices (e.g., random access memory), etc. In some embodiments, computer readable program code 830 is configured such that, when executed by data processing system 835, code 830 causes the processing system to perform steps described above.

In other embodiments, computer 800 may be configured to perform steps described above without the need for code 830. For example, data processing system 835 may consist merely of specialized hardware, such as one or more application-specific integrated circuits (ASICs). Hence, the features of the present invention described above may be implemented in hardware and/or software. For example, in some embodiments, the functional tiers described above may be implemented by data processing system 835 executing computer instructions 830, by data processing system 835 operating independent of any computer instructions 830, or by any suitable combination of hardware and/or software.

The OHM systems and methods may be implemented in various platforms. The following examples of OHM implementation are for example only, and are not intended to further limit the invention. A person of skill in the art can appreciate that OHM may be implemented in a variety of platforms.

For example, in a preferred embodiment, OHM may be implemented as computer readable program code 830 on a computer readable medium 820 across one or more computers 800. The OHM system, running on one or more computers 800, may access one or more data sources 110 located, for example, locally in the one or more computers' 800 data storage systems 805, or externally through network 810. One motivation to run OHM locally on a computer 800 may be to achieve lower latency and a faster run-time.

In other embodiments, OHM may be run on the Internet, accessed by a computer 800 via a connection, such as buses and cables, to network 810. One motivation for an Internet embodiment may be to allow OHM access to various Internet based data sources 110. Many data sources 110 on the Internet are configured with open source end points, such as SPARQL, and therefore may be potential OHM data sources 110.

In another embodiment, OHM may be implemented on a private cloud within a cloud. For example, many data sources 110 may be sitting on a private or non-private cloud associated with an entity. The entity may desire certain features, such as integration, security, business applications, etc., and thereby may choose to implement OHM on a private cloud within the enterprise cloud.

Figure 9:
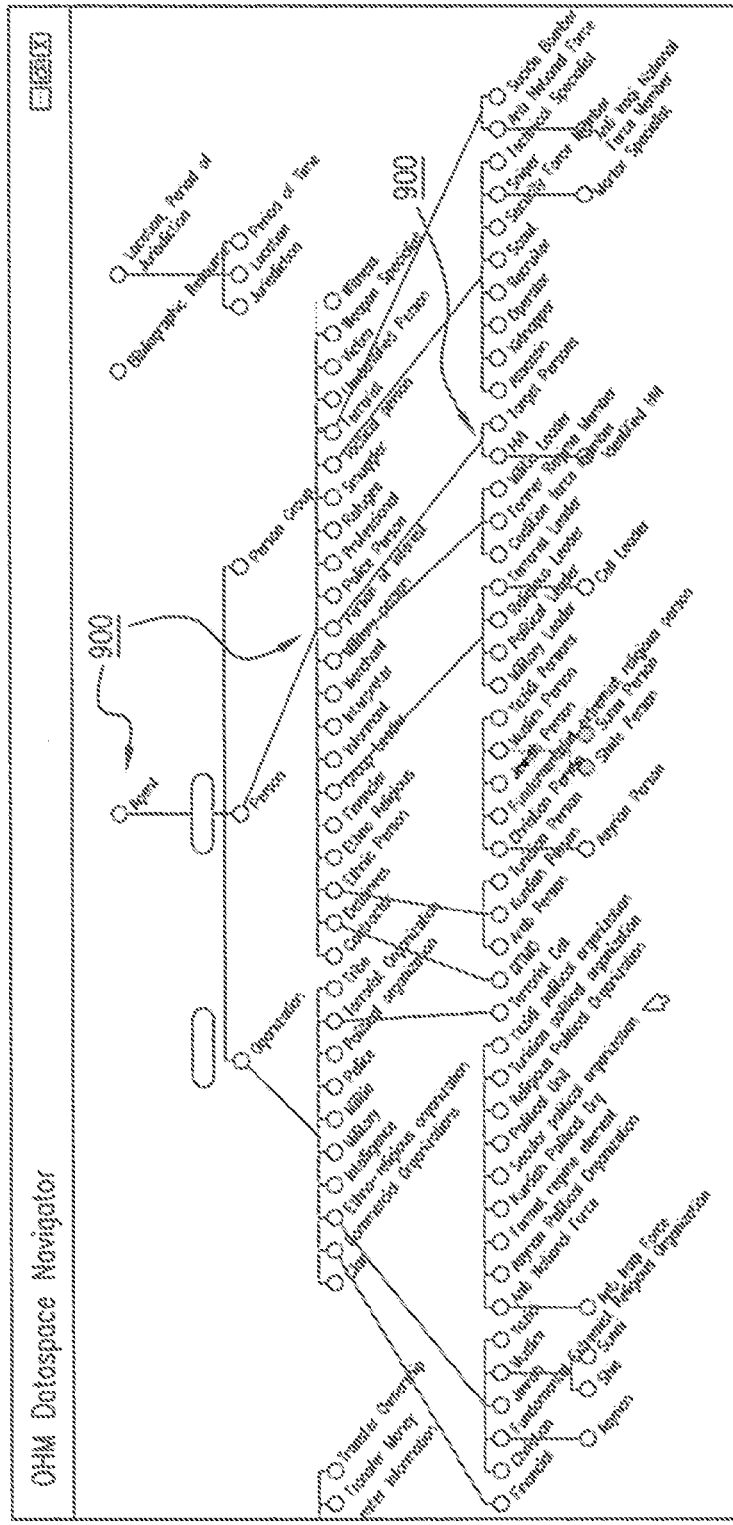
FIG. 9 is an Illustrative workspace window generated by the OHM system, according to the present invention, including an OHM ontology explorer.

Referring now to FIG. 9, an Illustrative workspace window generated by the OHM system according to the present invention including an OHM ontology explorer is shown. In an exemplary embodiment, the OHM system 100 is accessible via analytic layer 105 as a GUI on the application program interface. The GUI may be displayed on a display means, such as a monitor or screen, connected to a computer 800. Additionally, there may be one or more input devices, such as a mouse and keyboard, connected to computer 800 that may be used to interact with the GUI and direct or send commands the OHM system.

According to an exemplary embodiment of the invention, FIG. 9 illustrates the dataspace navigator that, for example, may be displayed on the OHM GUI. As explained above, the data schemas can be complex and have hierarchical and logical relationships. In an exemplary embodiment, the OHM GUI, via a dataspace navigator, displays a virtual unified view of a plurality of data sources 110. This global, cohesive view of the collection of data sources provides an integrated view of the data so that a user may observe the relationships across all the data sources 110.

Furthermore, the dataspace navigator may generate an integrated display of one or more chosen data sources 110, or all of the data sources 110, that reflects the complex relationships within the data using, for example, tree graphs with a hierarchy of nodes 900 and edges. As shown in the tree graph generated by the OHM GUI and dataspace navigator in FIG. 9, one relationship may be that a "Person of Interest" may also be described as a "Person," which may also be described as an "Agent." This relationship is represented displaying a "Person of Interest" node 900 as being connected by an edge to a "Person" node 900, which in turn is connected by an edge to an "Agent" node 900.

In addition to displaying the relationships themselves, the dataspace navigator may optionally display data volume statistics about the underlying data sources 110. For example, such data volume statistics may include how much data is available for the various classes and relationships in the ontology. In an exemplary embodiment, the dataspace navigator will display an integrated view of the data sources 110 and how many calls there are across the data sources 110 for each attribute or node 900 in the OHM system.

Figure 10A:
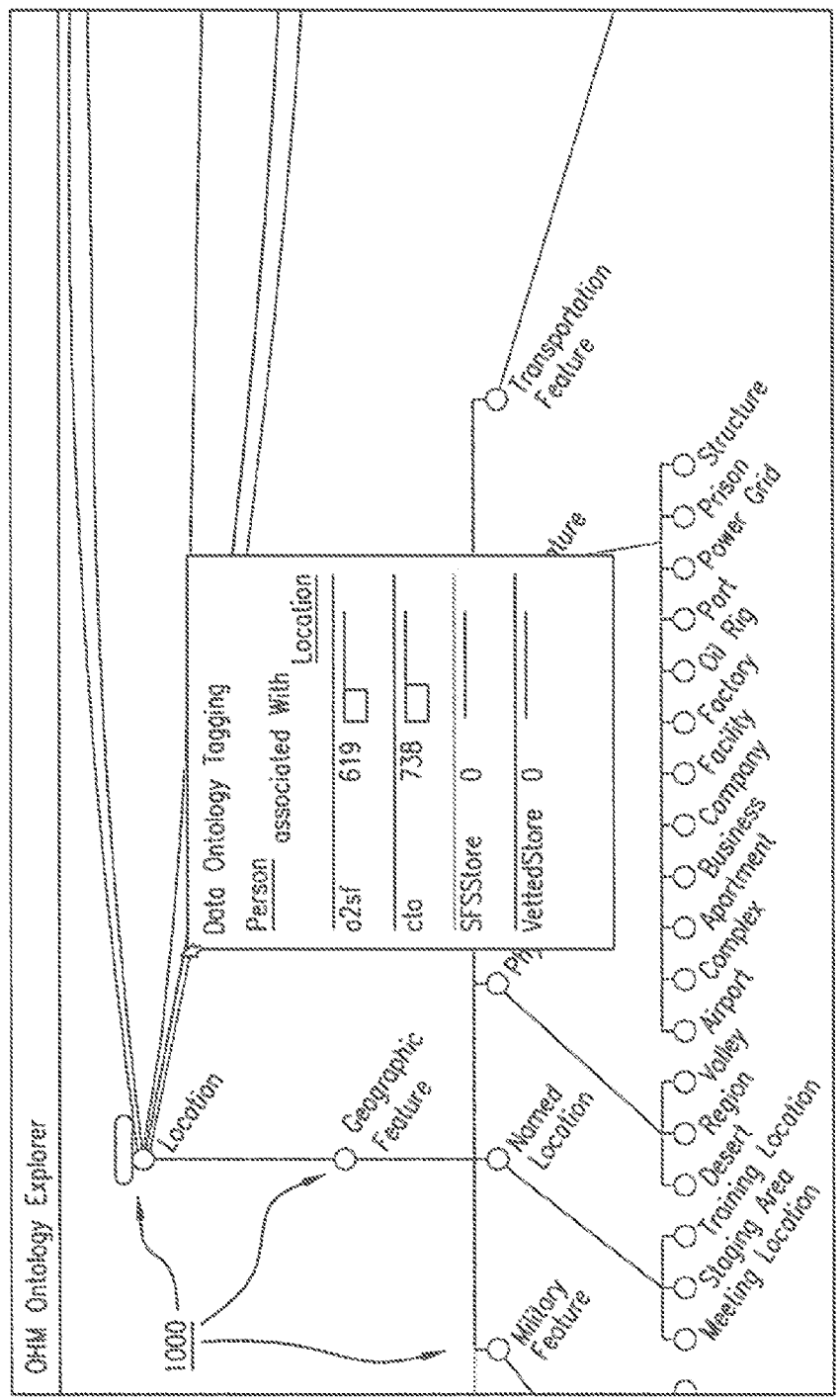
FIG. 10a is an illustrative workspace window generated by the OHM system, according to the present invention, including data ontology tagging.

Referring now to FIG. 10a, an illustrative workspace window generated by the OHM system according to the present invention, including data ontology tagging, is shown. FIG. 10a contains a view of an ontology associated with one or more data sources 110, as may be displayed in the OHM ontology explorer on the OHM GUI. In an exemplary embodiment, like the OHM dataspace navigator with respect to data sources, the OHM ontology explorer depicts the relationships between attributes or fields within one or more ontologies. These relationships may be displayed, for example, as a tree graph with nodes 1000 and edges describing the relationships within an ontology. Separate tree graphs displayed in the OHM ontology explorer may depict different ontologies.

For example, in the tree graph in FIG. 10a, there is a "Location" node 1000, which is connected by an edge to a "Geographic Feature" node 1000, which in turn is connected by an edge to a "Military Feature" node 1000 in order to reflect a logical relationship between a "Location," a "Geographic Feature," and a "Military Feature."

In an exemplary embodiment, additional relationships may be described between the ontologies in the OHM ontology explorer for the purpose of generating queries. Such relationships may be created with a Data Ontology Tagging feature in the OHM GUI that allows a user to add a tag between nodes of an ontology. For example, as shown in FIG. 10a, a "Person" node 1000 may be selected and tagged with, or connected to, a "Location" node 1000 by the descriptor "associatedWith" in order to express the relationship of a person associated with a location. Such ontology tagging may also be implemented among the nodes 1000 in the OHM dataspace navigator.

In other embodiments, a user may choose to select and tag multiple nodes 1000 in the OHM dataspace navigator or OHM ontology explorer in order to designate a mapping between the node 1000 attributes.

Figure 10B:
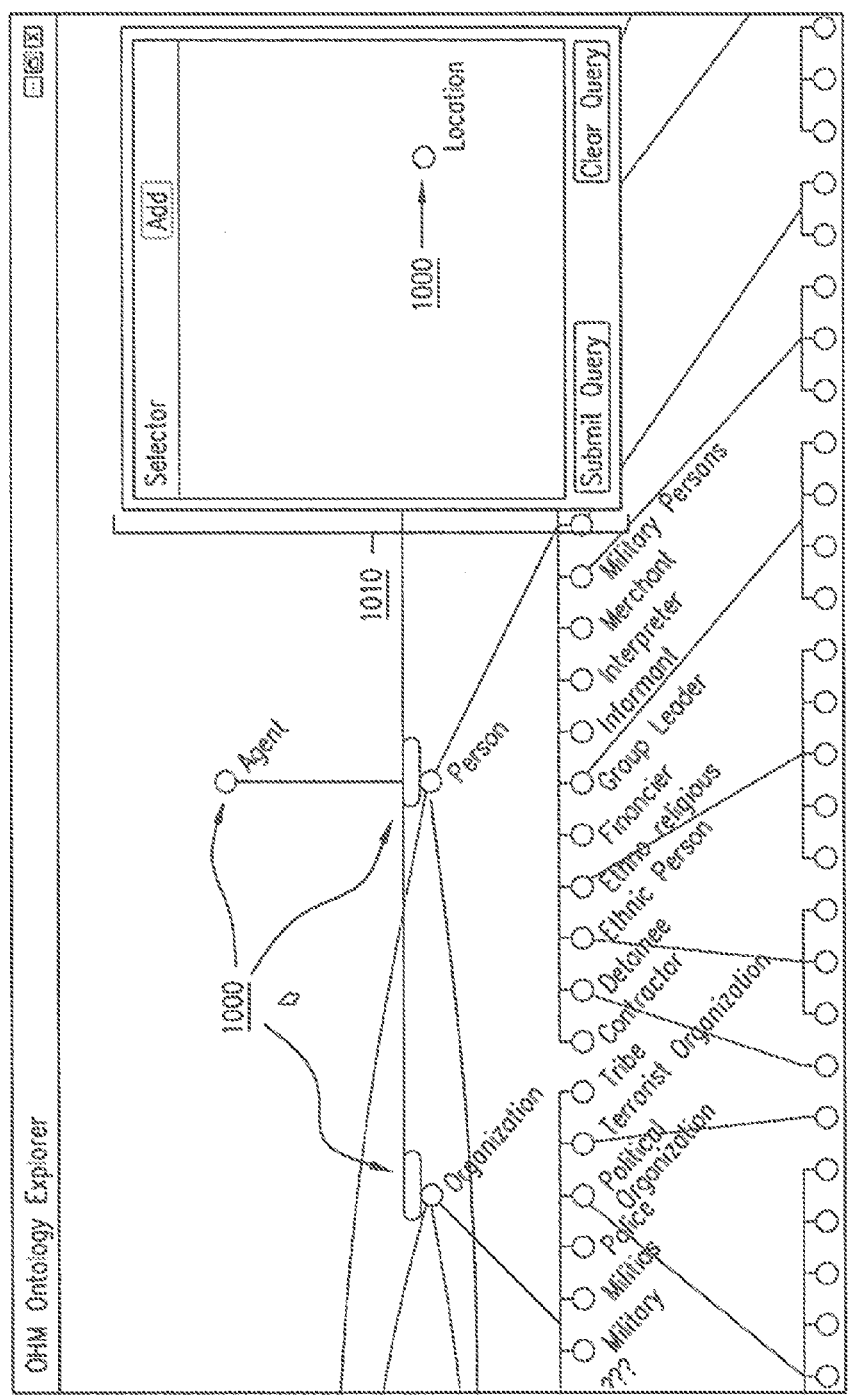
FIG. 10b is an Illustrative workspace window generated by the OHM system, according to the present invention, including data ontology tagging and a visual query tool.

Referring now to FIG. 10b, an Illustrative workspace window generated by the OHM system according to the present invention, including data ontology tagging and a visual query tool, is shown. FIG. 10b displays an alternate view of the OHM Ontology Explorer that is presented in FIG. 10a. As shown in FIG. 10b, the "Location" node 1000 has been selected, by a user with an input device, from one ontology tree graph and is being displayed in the OHM visual query tool display 1010. In an exemplary embodiment, a user may then select additional nodes 1000 in the OHM Ontology Explorer in order to create a query reflecting one or more relationships between terms. For example, in FIG. 10b, the nodes 1000 "Location," "Person," and "Organization" have been selected in order to generate a query. The above features may additionally or alternatively be implemented for the nodes 1000 in the OHM dataspace navigator.

Figure 11:
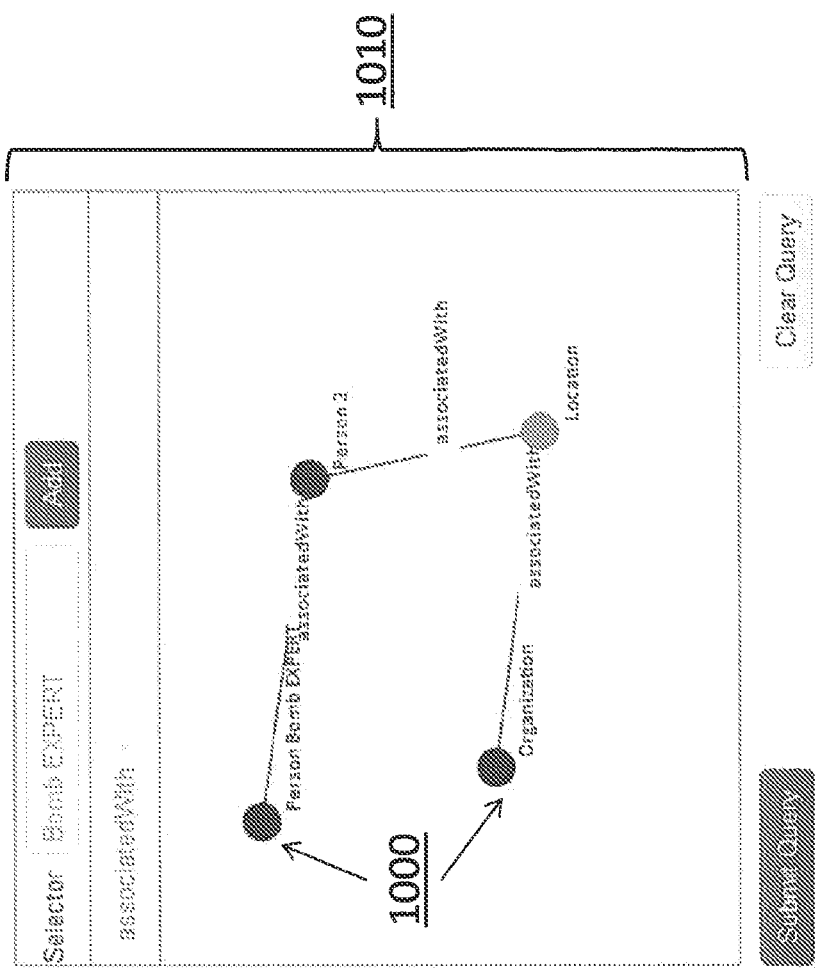
FIG. 11 is an illustrative workspace window generated by the OHM system, according to the present invention, including a visual query tool.

Now referring to FIG. 11, an illustrative workspace window generated by the OHM system according to the present invention, including a visual query tool, is displayed. In a preferred embodiment, one or more ontology nodes from the OHM Ontology Explorer may be selected to be included in a query. Additionally, various relationships between the selected ontology nodes may be described, for example, by the relationship "associated with," for the purposes of generating a query.

In an exemplary embodiment, a query may be visually displayed in the OHM visual query tool 1010 as a series of nodes 1000 and edges, or as a tree graph corresponding to an ontology. To generate and view a query, one or more nodes 1000 associated with one or more terms may be connected to other nodes 1000 by edges, with the edges describing relationships between the terms of the connected nodes. For example, FIG. 11 depicts a query in the OHM visual query tool 1010 that will search across one or more data sources for results where a bomb expert is associated with a second person, where the second person is associated with a location, and the location is associated with an organization.

Figure 12:
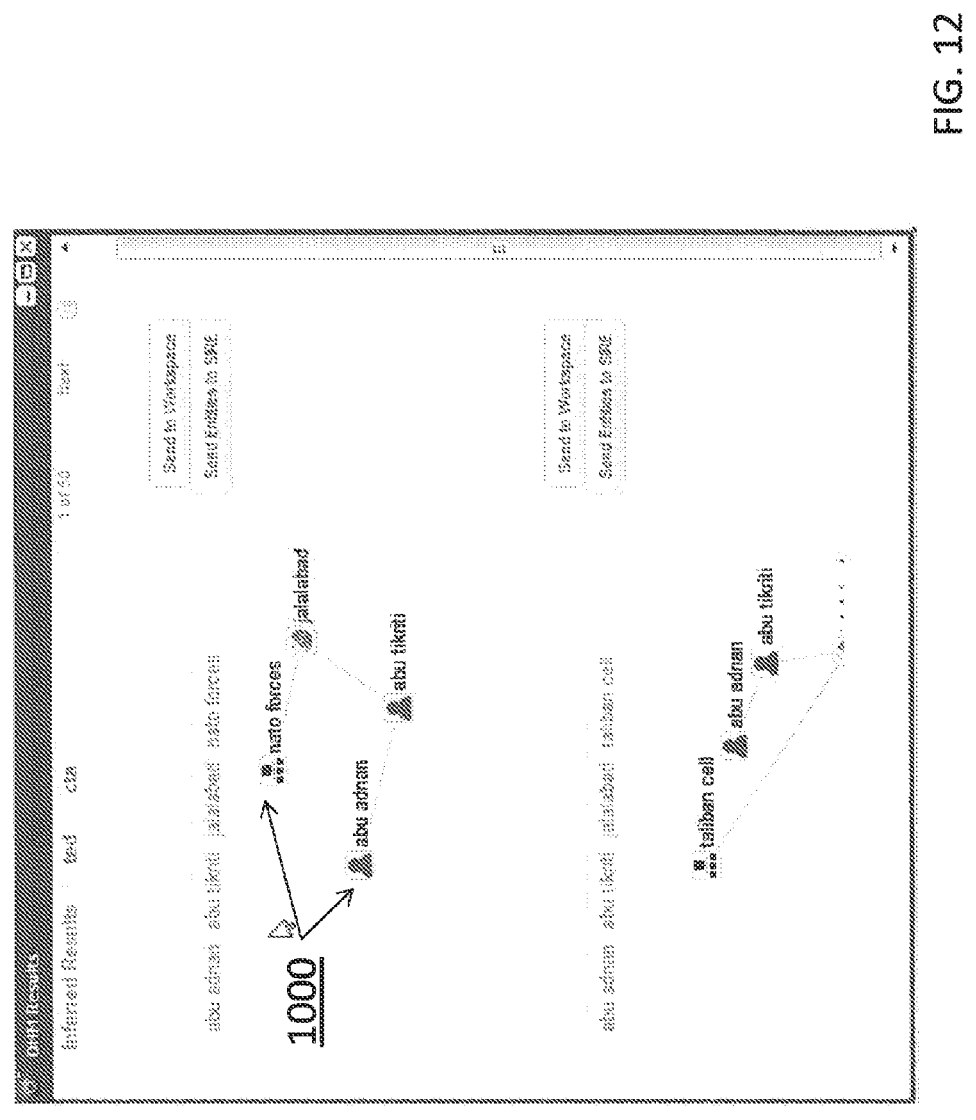

Now referring to FIG. 12, an illustrative workspace window generated by the OHM system according to the present invention, including a virtual unified view of query results, is shown. In an exemplary embodiment, a result set corresponding to an issued query may be returned and displayed to the user in a form corresponding to the ontology of the issued query. Consequently, the result set may consist of a set of one or more nodes 1000 and edges that correspond to the visual query issued in the OHM visual query tool 1010.

In an exemplary embodiment, the query ontology is translated into one or more translated queries, where each translated query targets a respective ontology different from the query ontology. The translated query ontologies correspond to the ontologies associated with the data sources 110 so that the query may be executed across, for example, many large scale heterogeneous data sources 110. The OHM system may return a result set in a form corresponding to the translated query ontology associated with one or more data sources 110. The OHM system may then translate the one or more result sets into the original query ontology in order to present a unified view of query results in the OHM GUI, For example, FIG. 12 depicts the results from the query issued in FIG. 11 for scenarios where a bomb expert is associated with a second person, where the second person is associated with a location, and the location is associated with an organization. The first result in FIG. 12 shows that an individual Abu Adnan, a bomb expert, is associated with Abu Tikriti, a second person, who is associated with the city of Jalalabad, a location, which is associated with NATO forces, an organization. The result sets may be returned in a format corresponding to a different ontology, for example, that corresponds to an underlying data source 110. However, in FIG. 12, the result set is displayed to the user in the ontology format used in the initial query to create a unified view of query results.

Figure 13:
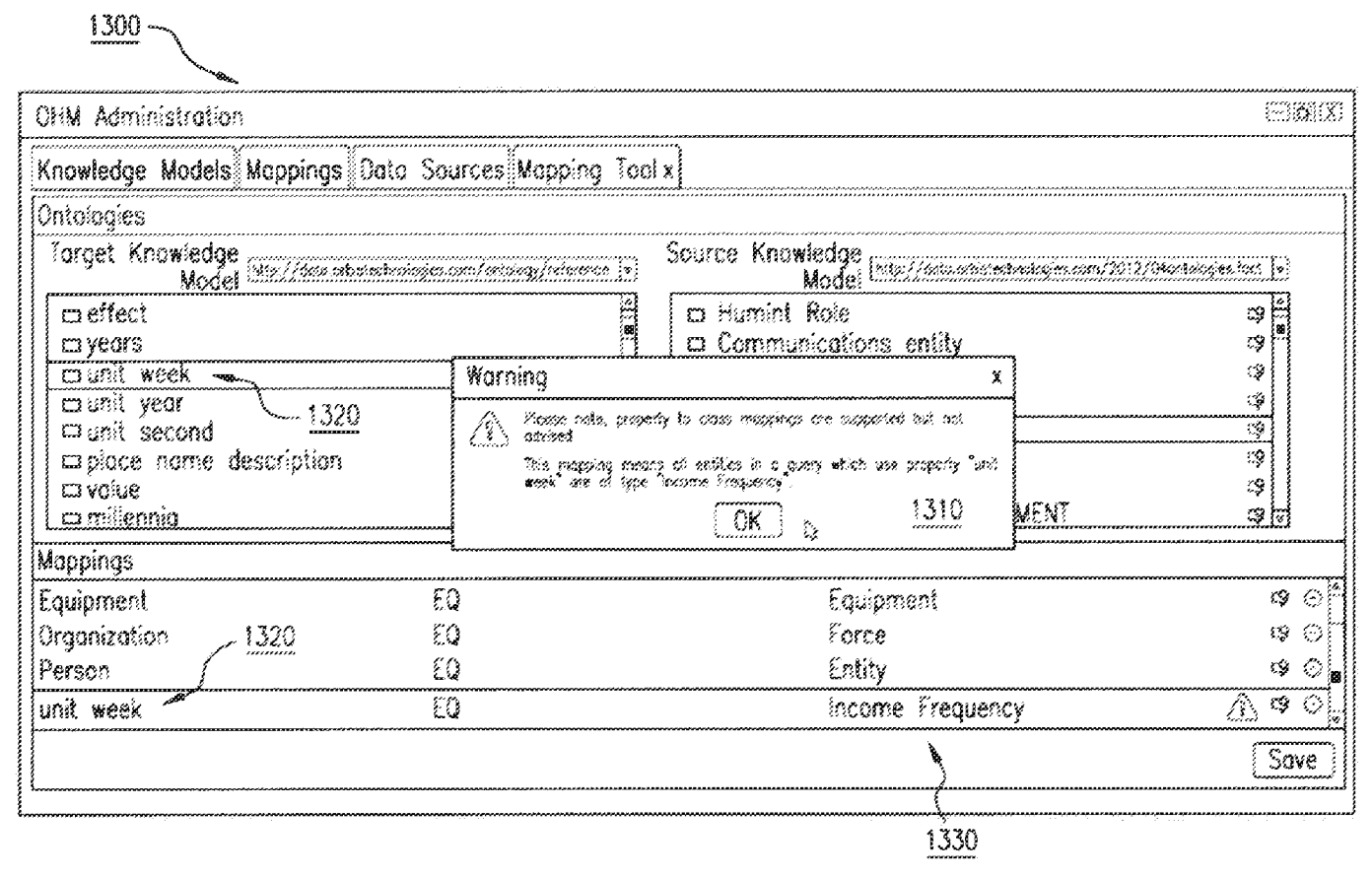

Referring now to FIG. 13, an illustrative workspace window generated by the OHM system according to the present invention, including a mapping advisory feature, is shown. FIG. 13 is an illustrative workspace window 1300 that displays the instance mapping feature, as shown and explained above for FIG. 3. The Instance mapping feature allows a user to map and convert instances from one ontology format to another ontology format. However, in an exemplary embodiment, OHM has a mapping advisory feature that may prevent a user from making an ill-advised mapping. For example, an ill-advised mapping would be where two or more terms are mapped to each other but the terms have nothing in common. When a user makes an ill-advised mapping, the mapping advisory feature may generate a "warning" window 1310 that advises the user that the specified mapping is not advised. As displayed in FIG. 13, one such ill-advised mapping may include, for example, mapping a "unit week" 1320 to "Income frequency," 1330 which are unrelated terms. In some embodiments, Ill-advised, in addition to preferential, mappings may be defined through by coding rules into the OHM system.

As explained above, OHM is able to provide enterprise integration of large scale heterogeneous data sources via lightweight query translation on runtime. OHM works across a heterogeneous data federation, and mediates data that might live in, for example, triple stores, NoSQL stores, RDBMS, and others. Furthermore, in an exemplary embodiment, OHM affixes a semantic layer or ontology on private clouds and enables semantic web technology on traditional systems. This architecture allows for semantic querying of the underlying sources to the extent they are capable.

Furthermore, in some embodiments, OHM may be deployed on real-time systems. This allows OHM to federate over OLAP/OLTP and stored systems.

Since the data sources are ingested in their native format, the data sources 110 in data federation 140 may be well described. The kind of data each source can provide is described by the source ontology associated with each data source. In addition, in some embodiments, statistics may be maintained about how much data is available for the various classes and relationships in the ontology. This allows the user, for example, to ask queries on the populated sections of data. In other embodiments, the statistic information allows for join order optimization based on data volume.

The above described processes and functionality of OHM can be used in a variety of implementations. For example, OHM can be used to integrate various heterogeneous data stores and provide a virtual, unified view on the data. Additionally, OHM can be used to fuse low level data into progressively more abstract information for human consumption. OHM can provide SPARQL style complex semantic search on a federation. OHM provides and works on a data federation that may be composed of varying substrates such as, for example, NoSQL, SQL, Triple Stores, etc. OHM can be used for selective synchronization of data across multiple private clouds. Experts from different domains can use OHM to collaborate better and contribute to a common knowledge base. OHM can model information systems and tag diagnostic and log data to the ontologies for the various systems. OHM can use ontologies for physical processes, and combine data from sources for the processes. This would allow for selective generation of missing data via the mediation between the ontologies. OHM may include a variety of tools that allows for creation, storage, versioning, and visualtion of ontologies and mappings between them, such as through a GUI in an analytics layer. OHM can be affixed on top of a non-semantic stack such as a NoSQL based solution and provide some semantic capabilities. Additionally, OHM, in some embodiments, may allow a user to analyze not only the structure but the distribution of data. This allows the user to ask targeted and populated queries.

While the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Additionally, while various embodiments and Implementations of the present invention have been described above, it should be understood that they have been presented by way of example only, and not limitation. Thus, the breadth and scope of the present invention should not be limited by any of the above-described exemplary embodiments.

As used herein, the term "ontology" may refer to any format that indicates entities and relationships. Although many examples are described herein using RDF or OWL, other semantic representations are possible in different embodiments.

The invention claimed is:

1. A method of servicing a multi-database query, the method comprising:
   receiving, by a computer, a query targeting a first ontology, wherein the first ontology comprises a user analytic ontology specified by a user;
   translating, by a computer, the query into one or more translated queries, each translated query targeting a respective ontology different from the first ontology;
   for each of the translated queries:
      issuing the translated query, by a computer, to a respective database organized according to the respective ontology of the translated query, and
      receiving, by a computer, a respective result set for the translated query, wherein the respective result set corresponds to the respective ontology of the translated query;
   for each of the respective result sets:
      translating, by a computer, the respective result set into a translated result set corresponding to the first ontology;
   aggregating, by a computer, the translated result sets into an aggregated result set corresponding to the first ontology;
   returning, by a computer, the aggregated results set corresponding to the first ontology;
   maintaining, by a computer, a plurality of ontologies and ontology alignments and mappings associated with said databases through versioning and governance of metadata of said databases;
   describing, by a computer, each database by a database schema;
   overlaying, by a computer, one or more database ontologies to each of said database schemas;
   mapping, by a computer, said database ontologies to a plurality of small domain ontologies; and
   combining, by a computer, said plurality of small domain ontologies to create system ontologies.

2. The method of claim 1, further comprising:
   mapping, by a computer, a target ontology to a plurality of source ontologies.

3. The method of claim 2, wherein said first ontology comprises a target ontology, and said respective ontology different from the first ontology comprises a source ontology mapped to said target ontology.

4. The method of claim 3, wherein the said translated result set corresponds to the target ontology.

5. The method of claim 1 wherein said database comprises data being stored in its native data format.

6. The method of claim 5, further comprising:
   adapting, by a computer, the data stored in said databases to a standard RDF format.

7. The method of claim 6, further comprising:
   configuring, by a computer, said databases with a semantic web enabled layer.

8. The method of claim 7, wherein said semantic web enabled layer comprises a SPARQL endpoint.

9. The method of claim 1, further comprising:
   mediating, by a computer, a plurality of ontologies.

10. The method of claim 9, wherein said plurality of ontologies are mediated to a central ontology in a star configuration.

11. The method of claim 9 wherein said mediating a plurality of ontologies is performed using open standards comprising OWL, RDF, and EDOAL.

12. The method of claim 9, wherein said mediating a plurality of ontologies comprises:
mapping, by a computer, a plurality of ontologies using defined mappings, wherein said defined mappings comprise formal semantic language.

13. The method of claim 9 where mediating, by a computer, a plurality of ontologies comprises:
defining, using a computer, custom mappings of ontology instances from one format to another.

14. The method of claim 9 where mediating, by a computer, a plurality of ontologies comprises:
storing, by a computer, data associated with data in said database for entity correlation and disambiguation.

15. The method of claim 9 where mediating, by a computer, a plurality of ontologies comprises:
storing, by a computer, source specific statistics and metadata describing the content of said database both qualitatively and quantitatively.

16. The method of claim 1, further comprising:
storing, by a computer, data associated with data in said databases for entity correlation and disambiguation.

17. The method of claim 1, further comprising:
storing, by a computer, source specific statistics and metadata describing the data in said databases both qualitatively and quantitatively.

18. The method of claim 1, further comprising:
displaying, by a computer, results in a virtual unified view.

19. The method of claim 1, further comprising:
mediating between the plurality of databases using a plurality of rules.

20. A system comprising:
two or more databases;
one or more computer processing cores; and
one or more memories coupled to the computer processing cores and storing program instructions executable by the processing cores to implement an ontology harmonization and mediation engine configured to issue a query across said two or more databases by:
maintaining a plurality of ontologies and ontology alignments and mappings associated with said databases through versioning and governance of metadata of said databases;
describing each said database by a database schema;
overlaying one or more database ontologies to each of said database schemas;
mapping said database ontologies to a plurality of small domain ontologies;
combining said plurality of small domain ontologies to create system ontologies;
receiving a query targeting a first ontology, wherein the first ontology comprises a user analytic ontology specified by a user;
translating the query into one or more translated queries, each translated query targeting a respective ontology different from the first ontology;
for each of the translated queries:
issuing the translated query to a respective said database organized according to the respective ontology of the translated query, and
receiving a respective result set for the translated query, wherein the respective result set corresponds to the respective ontology of the translated query;
for each of the respective result sets:
translating the respective result set into a translated result set corresponding to the first ontology;
aggregating the result sets into an aggregated result set corresponding to the first ontology; and
returning the aggregated results set corresponding to the first ontology.

21. The system of claim 20 further comprising:
mapping a target ontology to a plurality of source ontologies.

22. The system of claim 21, wherein said first ontology comprises a target ontology, and said respective ontology different from the first ontology comprises a source ontology mapped to said target ontology.

23. The system of claim 20 wherein said two or more databases comprise data being stored in its native data format.

24. The system of claim 23, further comprising:
adapting the data stored in said databases to a standard RDF format.

25. The system of claim 24, further comprising:
configuring said databases with a semantic web enabled layer.

26. The system of claim 23, wherein said semantic web enabled layer comprises a SPARQL endpoint.

27. The system of claim 20, further comprising:
mediating a plurality of ontologies.

28. The system of claim 27, wherein said plurality of ontologies are mediated to a central ontology in a star configuration.

29. The system of claim 27, wherein said mediating a plurality of ontologies is performed using open standards comprising OWL, RDF, and EDOAL.

30. The system of claim 27, wherein said mediating a plurality of ontologies comprises:
mapping a plurality of ontologies using defined mappings, wherein said defined mappings comprise formal semantic language.

31. The system of claim 27, wherein the said translated result set corresponds to the target ontology.

32. The system of claim 27 where mediating a plurality of ontologies comprises:
defining custom mappings of ontology instances from one format to another.

33. The system of claim 27 where mediating a plurality of ontologies comprises:
storing, in said one or more memories, data associated with data in said database for entity correlation and disambiguation.

34. The system of claim 27 where mediating a plurality of ontologies comprises:
storing, in said one or more memories, source specific statistics and metadata describing the content of said database both qualitatively and quantitatively.

35. The system of claim 20, further comprising:
storing, in said one or more memories, data associated with data in said databases for entity correlation and disambiguation.

36. The system of claim 20, further comprising:
storing, in said one or more memories, source specific statistics and metadata describing the data in said databases both qualitatively and quantitatively.

37. The system of claim 20, further comprising:
a video display interface, wherein said video display interface is coupled to said one or more computer processing cores and is configured to:
display said query results in a virtual unified view.

* * * * *